Feb. 21, 1967   L. H. LEONARD, JR   3,304,997
STEAM-OPERATED REFRIGERATION SYSTEM
Original Filed June 23, 1964   3 Sheets-Sheet 1

*INVENTOR.*
LOUIS H. LEONARD, JR.
BY
ATTORNEY.

Feb. 21, 1967 L. H. LEONARD, JR 3,304,997
STEAM-OPERATED REFRIGERATION SYSTEM
Original Filed June 23, 1964 3 Sheets-Sheet 2
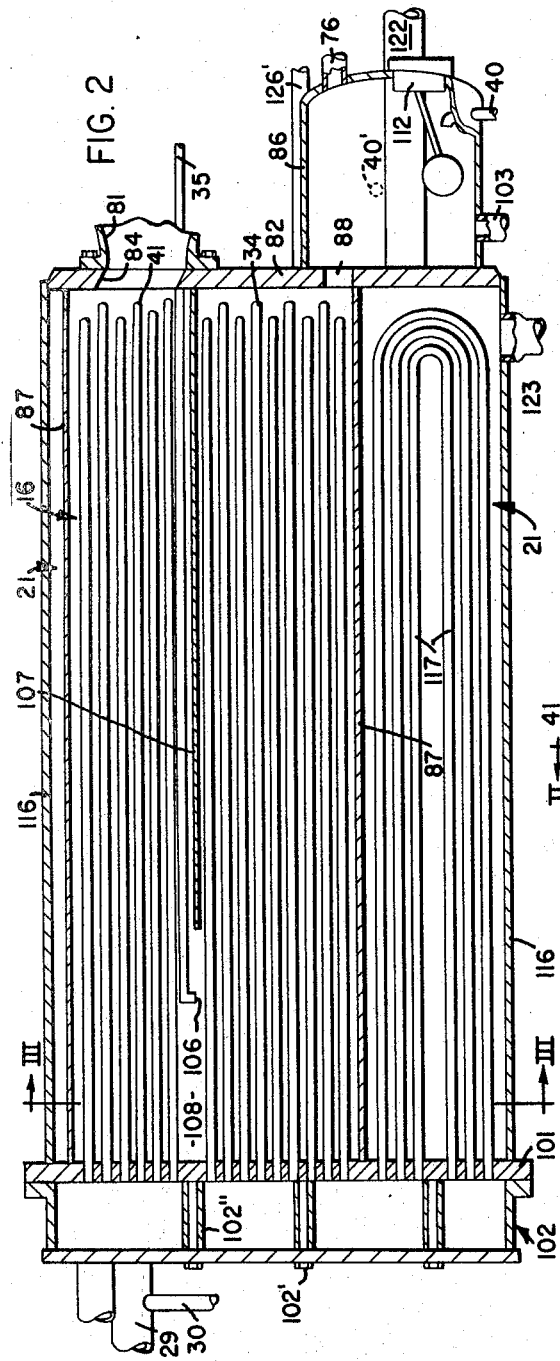
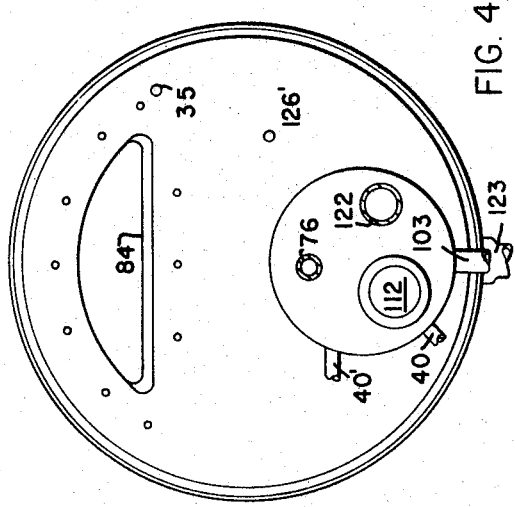
FIG. 4
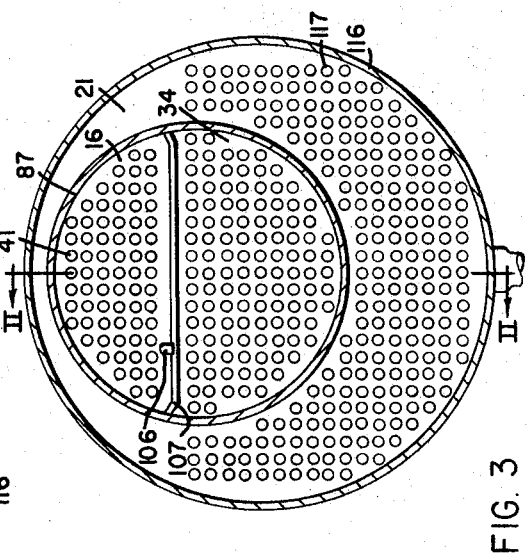
FIG. 3
INVENTOR.
LOUIS H. LEONARD, JR.
BY
ATTORNEY.

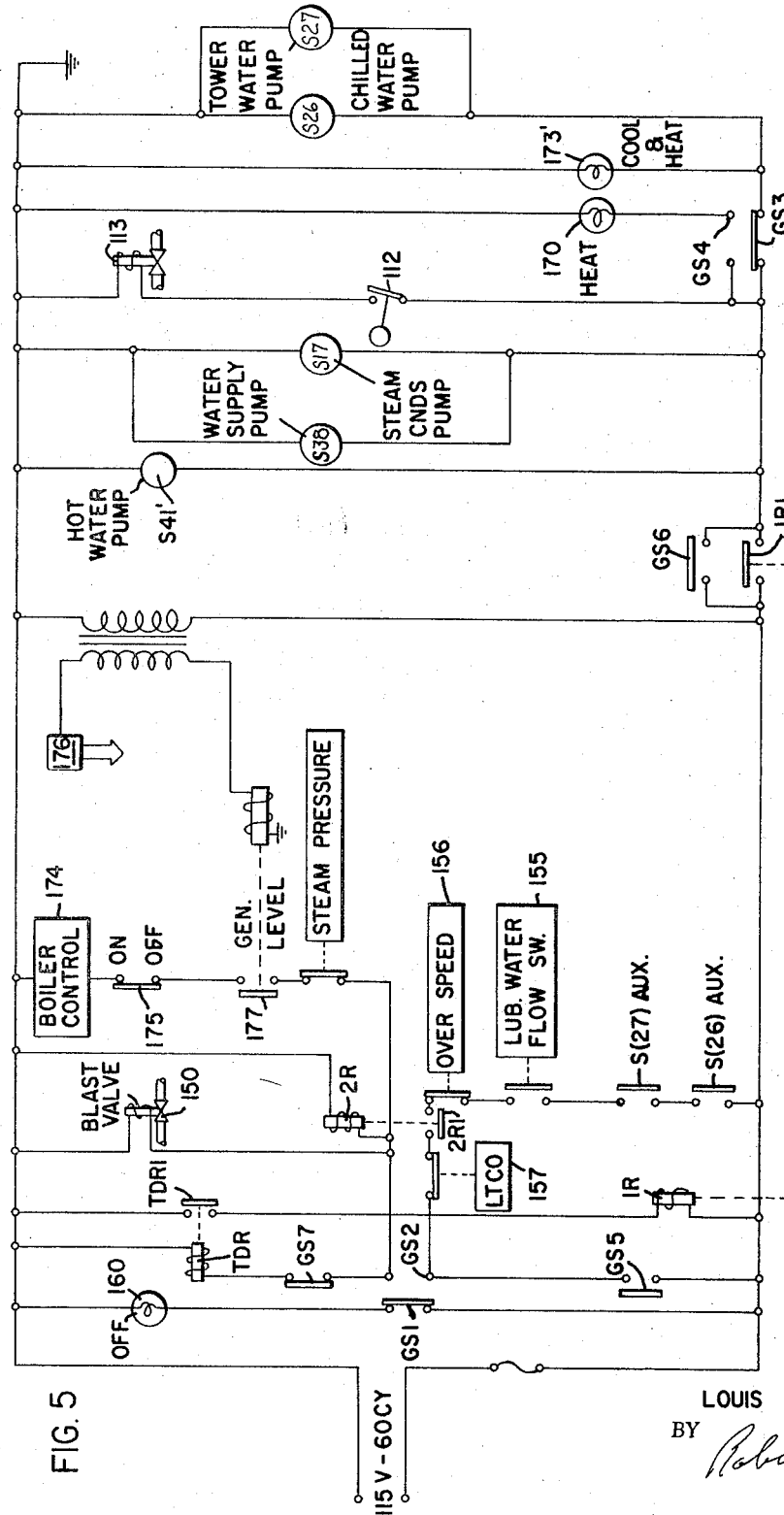
Feb. 21, 1967  L. H. LEONARD, JR  3,304,997
STEAM-OPERATED REFRIGERATION SYSTEM
Original Filed June 23, 1964  3 Sheets-Sheet 3
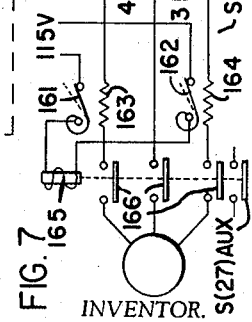
INVENTOR.
LOUIS H. LEONARD, JR.
BY
ATTORNEY.

United States Patent Office 3,304,997
Patented Feb. 21, 1967

3,304,997
STEAM-OPERATED REFRIGERATION SYSTEM
Louis H. Leonard, Jr., Dewitt, N.Y., assignor to Carrier Corporation, Syracuse, N.Y., a corporation of Delaware
Original application June 23, 1964, Ser. No. 377,313. Divided and this application May 24, 1965, Ser. No. 471,780
3 Claims. (Cl. 165—1)

This application is a division of Patent No. 3,276,218 entitled "Refrigeration System."

This invention relates to a method of operating a fluid system and of providing refrigeration, and to a refrigeration system. More particularly, the invention relates to controlling a steam powered refrigeration system and the condensing of steam, and to preventing leakage in a refrigeration system during shutdown of the system.

Various types of refrigeration systems, such as absorption systems and refrigerant compressor systems are well known in the art. The construction components, and relative association of the components, as well as the operating characteristics of such systems are also well known. However, each system has certain disadvantages as well as particular advantages, but attempts to provide a system combining the advantages of the accepted systems while avoiding their disadvantages have resulted in systems which were impractical.

For example, various expedients are known in the art for automatically controlling the capacity of various systems. In systems utilizing a refrigerant compressor, such control is usually accomplished by varying the compressor speed or adjusting guide vanes in the compressor inlet to regulate the flow of refrigerant. Guide vane installations are expensive and generally require involved actuating mechanism. In systems which provide capacity control by regulating the compressor speed, this is commonly accomplished by controlling the speed of the compressor drive means, such as a steam turbine. Turbine speed control is generally obtained by varying the pressure of steam supplied to the turbine and this is usually accomplished either by varying the heat input to a steam generator or by adjusting a steam pressure regulating valve in the line between the steam generator and the turbine. Regulating the heat input to the steam generator usually results in slow response because an inherently slow response of the steam generator causes the speed change of the turbine to lag behind the control signal varying the heat input to the steam generator, resulting in a slow change of the capacity of the system. When a steam pressure regulating valve is used, a significant pressure drop often exists across the valve at high cooling loads, and this may result in an unnecessarily high steam rate producing higher operating costs. Furthermore, suitable steam pressure regulating valves are expensive and often require complicated and expensive electrical or mechanical operating controls which increase the cost of the system. Another consideration is that of inherent instability of prior refrigeration system controls in that large, almost instantaneous changes in the operation of the system may occur for a variety of reasons, as is understood in the art.

Furthermore, in order to assure safe operation of a turbine driven system, it is desirable to provide for substantially instantaneously stopping the turbine in the event of a system malfunction. Many safety control systems fail to respond sufficiently rapidly to assure immediate stopping, and often such controls are used so infrequently as to become stuck or otherwise inoperative and therefore generally unreliable.

Additionally, refrigeration systems which utilize a high speed centrifugal compressor and a relatively high molecular weight refrigerant are known to possess many theoretical advantages is size, cost and efficiency, as is more fully discussed in my prior copending United States patent application, Serial No. 112,679, filed May 25, 1961, for a "Method and Apparatus for Heating and Cooling." However, practical problems affect the life and reliability of many such systems, and these problems have greatly increased the cost and complexity of the systems, so that early systems of this type have received little general acceptance. For example, one problem is that of preventing leakage both during operation of the system and when the system is shut down. Leakage of air into the system, as well as leakage of steam into the refrigerant side of the system, when a steam driven turbocompressor is used, are troublesome problems in most systems. It is especially difficult to prevent the leakage of air into the system because a steam condenser employed with steam driven turbine equipment must operate below atmospheric pressure in order for the turbine to be thermodynamically efficient, particularly at full load conditions, resulting in the steam condenser leaks tending to suck air into the system.

It is sometimes desirable to control the condensing rate of a steam condenser and this is generally accomplished by controlling the quantity or temperature of condensing water passing through the steam condenser. Such control of the condensing water may produce objectionable scaling in the condenser, resulting in reduced capacity when a full condensing rate is required, as well as increasing maintenance cost in removing the scale. In a steam driven refrigeration system, another commonly encountered problem is that of reduced condensing capacity of the steam condenser resulting from refrigerant vapor collecting in the condenser and enveloping condensing portions of the steam condenser.

A primary object of this invention is to provide a new and improved control arrangement and method of controlling a refrigeration system.

It is an important object of this invention to provide a new and improved capacity control system for a steam driven refrigeration system. Control is accomplished by regulating the back pressure on drive means such as a turbine, for example, and, more particularly, by regulating steam condenser pressure. A related object is provision of such control responsive to regulating the condensing rate of steam discharged from the turbine. Another related object is provision of such control by regulated blanketing of a condensing portion of the steam condenser with a noncondensible vapor to suppress the condensing rate of steam discharged from the turbine. Another related object is provision for regulating the rate of injection of the noncondensible vapor into the steam condenser while purging the vapor from the steam condenser at a substantially constant rate. Another related object is provision for separating the purged noncondensible vapor and any steam carried thereby and returning the separated fluids for reuse in the system.

A still further object is provision of a new and improved control system and method of control in a refrigeration system to provide a stable system the normal operation of which changes slowly and, more particularly, wherein the system is controlled by leaving chilled water temperature. A related object is provision of such control wherein the system may be substantially instantaneously shut down.

A still further object is provision of a new and improved heat exchanger assembly. A related object is provision of such a heat exchanger assembly for condensing a power fluid, such as steam, in a refrigeration system. Another related object is provision of such a heat exchanger assembly in the form of a steam condenser. Another related object is provision of a new and improved method of operating such a heat exchanger assembly and, more particularly, of operating such a steam condenser. Another related object is provision for controlled blanketing of a condensing portion of the steam condenser with a noncondensible vapor to regulate the condensing rate of steam injected into the condenser. Another related object is provision for purging the condenser of the noncondensible vapor.

A still further object is provision of a new and improved surge prevention control and, more particularly, a hot gas bypass control in a refrigeration system. A related object is provision of such a hot gas bypass control, in a steam powered refrigeration system, responsive to conditions in the steam condenser and, more particularly, responsive to steam condenser pressure.

Another important object of this invention to provide a new and improved shutdown control system for a steam driven refrigeration system wherein shutdown is accomplished by raising the discharge or back pressure on drive means such as a turbine, and, more particularly, by raising steam condenser pressure. A related object is provision for substantially instantaneously shutting down the system manually, or automatically responsive to a predetermined condition in the system. Another related object is to provide for such shutdown by blanketing substantially all of the effective condensing portions of the steam condenser, thus stopping operation by increasing the back pressure on the turbine to that of the turbine inlet steam pressure and thereby pressurizing the system to effectively prevent leakage of ambient air into the system.

A still further object is provision of a new and improved hermetic refrigeration system and method of operation in which leakage of ambient air into the system is effectively prevented at shutdown. A related object is the use of refrigerant to pressurize the system to above atmospheric pressure. Another related object is provision for rapidly purging the pressurizing refrigerant to facilitate fast and smooth start-up.

These and other objects of the invention will be apparent from the following description and accompanying drawings in which:

FIGURE 2 is a broken, vertical longitudinal sectional view of a condenser unit including a steam condenser of this invention, and is taken generally along the line II—II in FIGURE 3;

FIGURE 3 is a vertical sectional view of the condenser unit taken generally along the line III—III in FIGURE 2;

FIGURE 4 is an end view from the right of the unit shown in FIGURE 2, with parts removed for clearer illustration;

FIGURE 5 is a schematic wiring diagram of an electrical portion of the control system;

FIGURE 6 is a gang switch schedule for FIGURE 5; and

FIGURE 7 is a schematic wiring diagram of a portion of the electrical control circuit.

Figure 1:
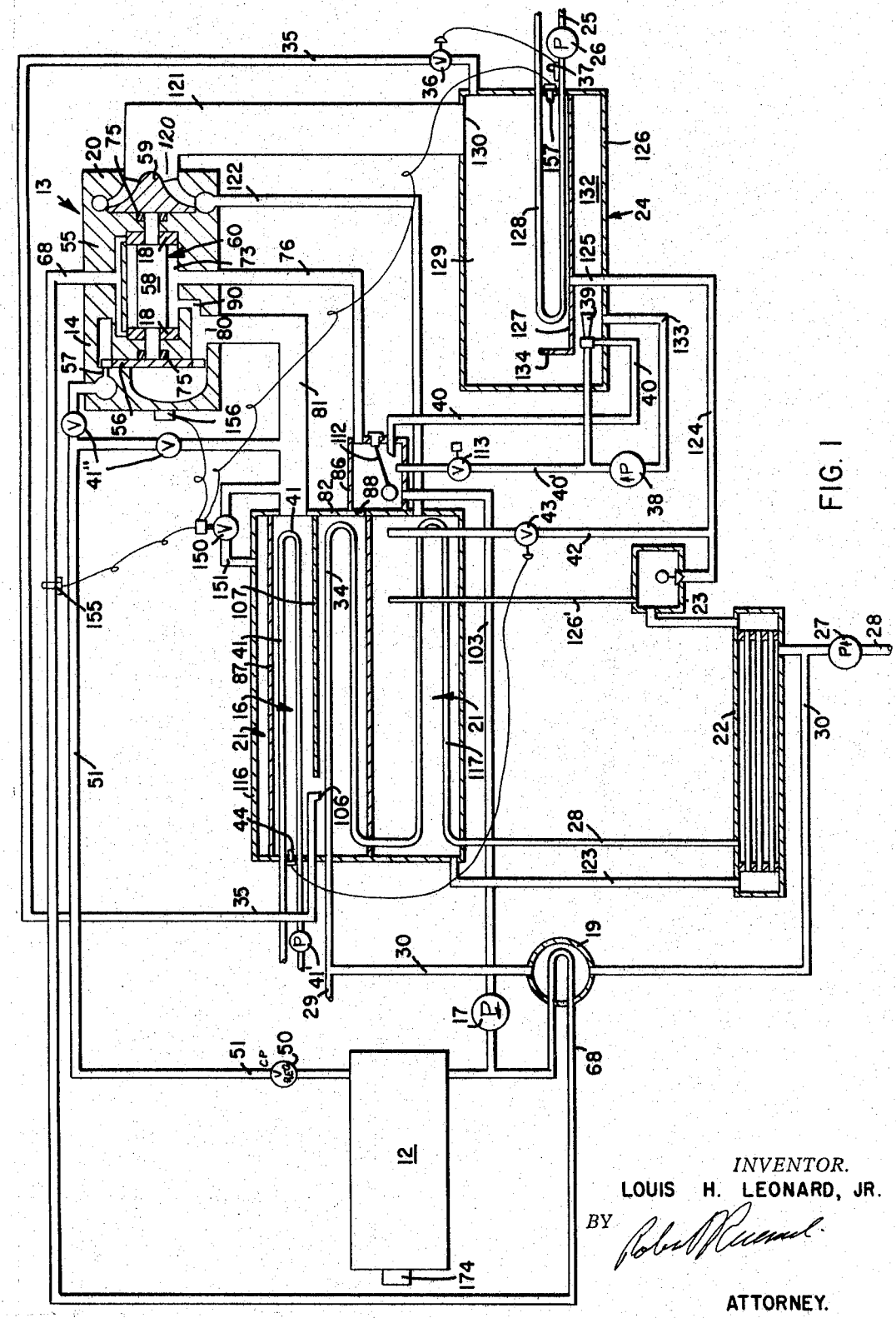
FIGURE 1 is a flow diagram of a preferred embodiment of a refrigeration system, and shows certain control features of the system.

The illustrated refrigeration system is preferably hermetic and may be considered as having a power side including a circuit for the circulation of power fluid, and a refrigerant side including a circuit for the flow of refrigerant under the influence of drive means driven by the power fluid, with the operation of the system regulated by a control system, as is more fully described along with other features of the system, in my copending United States Patent application Serial No. 377,258, entitled "Heating and Cooling System," filed June 23, 1964.

The invention will be described with reference to a preferred power fluid, which is water, and a preferred refrigerant which is octafluorocyclobutane, commonly referred to as C318 and having a chemical formula $C_4F_8$. These fluids are particularly preferred because of their relative immiscibility and because they are inherently highly stable and do not tend to decompose or chemically react with each other or other materials in the system, or cause or promote corrosion and undesirable byproducts. Also, this refrigerant is a relatively noncondensible vapor at the temperatures and pressures at which the power fluid (water) condenses as well as at the usual ambient atmospheric conditions of temperature and pressure. However, other power fluids and refrigerants having the desired chemical and physical properties may be utilized within the scope of this invention.

As illustrated in FIGURE 1, the power side includes a suitable steam generator 12 and a turbocompressor 13 including a turbine 14 which receives steam from the steam generator 12 and discharges exhaust steam to a steam condenser 16. A steam condensate pump 17 returns the steam condensate from the steam condenser 16 to the steam generator 12 for recirculation through the power side of the system. The turbocompressor 13 has water lubricated bearings, as 18, and the steam condensate pump 17 pumps steam condensate through a lubricant circuit including a lubricant heat exchanger 19 for lubricating the bearings 18.

The refrigerant side of the system includes a refrigerant compressor 20 of the turbocompressor 13. The compressor 20 is directly drivingly connected with the turbine 14 for passing compressed refrigerant vapor to a refrigerant condenser 21. Condensed refrigerant passes from the refrigerant condenser 21 to a refrigerant subcooler 22 and through suitable refrigerant flow restriction means 23 into an evaporator or cooler 24, from which the refrigerant vapor is withdrawn by the refrigerant compressor 20, thus completing the refrigerant circuit of the system. A chilled water line 25 extends into the cooler and carries a heat exchanger medium here in the form of chilled water, which is cooled by the refrigerant and circulated by a chilled water pump 26 to an area having a cooling requirement. The cooling capacity of the system varies in proportion to the compressor speed.

A cooling tower or condensing water pump 27 circulates tower water through an inlet line 28 to the refrigerant subcooler 22 and into the refrigerant condenser 21 and the steam condenser 16 and back to the tower through an outlet line 29. A branch line 30 in the condensing water inlet line 28 provides tower water to the lubricant water cooler 19 for cooling the lubricant water, and this branch terminates in the return line 29 to the tower. In general, control of condensing water temperature and flow rate is unnecessary, thus minimizing scaling of condensing surfaces in the condenser.

The control system regulates the cooling capacity of the refrigeration system by varying the turbine power output and, more particularly, the turbine steam discharge or back pressure which is substantially the same as the steam condenser pressure which is determined by the condensing rate of steam discharge into the steam condenser. The condensing rate of the steam condenser is regulated by controlled blanketing of a first condensing portion 34 with a noncondensible vapor, herein refrigerant vapor, introduced through a refrigerant line 35 from the cooler 24.

The quantity of noncondensible vapor effectively blanketing the first condensing portion 34 of the steam condenser is regulated by a modulating refrigerant flow control valve 36 in the line 35. The valve 36 is actuated responsive to leaving chilled water temperature by means of a temperature sensor 37 on a leaving branch of the chilled water line 25 so that as the cooling load drops more refrigerant is introduced into the steam condenser 16, thus reducing the steam condensing rate to increase the turbine back pressure and reduce the turbocompressor speed. The refrigerant is preferably withdrawn from the steam condenser at a constant rate, and herein a water supply pump 38 circulates water for operating a jet pump 39 which withdraws the noncondensible vapor from the steam condenser 16 through a purge line 40 opening into the throat of the jet pump. The water supply pump 38 further provides make-up water for the steam generator 12 through a make-up water line 40' to the steam condenser 16.

Means may be provided, if desired, for furnishing heat to satisfy a heating requirement and, herein a second condensing portion or tube bundle 41 in the steam condenser is maintained effectively free of such blanketing to maintain its full condensing capacity and maximum heating of a heat exchange medium, here in the form of water, circulated through the bundle by means of a heating water pump 41', to an area having a heating requirement. It should be noted that all pumps are preferably self-lubricated by the water being pumped.

If it is desired to provide only heating, as for winter heating, the condensing water pump 27 may be shut off and valve means 41" in the steam line to the turbocompressor 13 may be adjusted so that the steam bypasses the turbine 14 and is injected directly into the steam condenser 16 for heating the second condensing portion 41.

A hot gas bypass is part of the refrigerant side and as illustrated, a bypass line 42 between the refrigerant condenser 21 and the cooler 24 is controlled by a self-contained valve 43 responsive to steam condenser condition, herein steam condenser pressure as determined by a pressure sensor 44 of the valve 43. Alternatively, the valve 43 may be controlled responsive to steam condenser or turbine discharge steam temperatures which are equivalent to steam condenser pressure in view of existing saturated steam condition.

In the illustrated apparatus, the steam generator 12 supplies steam at a substantially constant pressure (15 p.s.i.g., for example) as controlled by a constant pressure regulating valve 50 in a steam supply line 51 to the turbine and including the valve means 41". By merely changing the turbocompressor, the machine may be operated with any normally desired steam pressure. The steam line 51 connects with a turbine steam inlet which is part of a turbocompressor housing 55. The supply steam drives a turbine rotor 56 operatively associated with a fixed nozzle ring 57. The turbine rotor assembly 56 is suitably mounted on an end of a turbocompressor shaft 58 and a compressor rotor 59 is mounted on an opposite end of the shaft and together define a turbocompressor rotor assembly 60 which is rotatably mounted in the turbocompressor housing 55 by means of the bearings 18.

The turbocompressor bearings 18 are preferably lubricated by water passed from the steam condensate pump 17 through a lubricant water supply line 68 passing through the lubricant water cooler 19 to the turbocompressor housing 55 where suitable passages communicate with the bearings 18. From the bearings 18 the water flows in a suitable manner, as along the shaft 58 and through suitable passages (not shown) into a chamber 73 generally in the center of the housing 55. Along with the chamber 73, suitable shaft seals, as 75, one at either end of the portion of the housing 55 mounting the shaft, provide flow restricting means which retards leakage between the turbine and the compressor. The lubricating water and any steam or refrigerant leakage entering the chamber 73 flows out of the turbocompressor through a drain 76 to the steam condenser 16.

Steam condensate is particularly desirable for lubricating the turbocompressor bearing 18 as it carries very little, if any, refrigerant which might flash in the bearing, and is substantially free of other impurities which are deposited in a suitable trap in the steam generator 12.

With particular reference to FIGURES 2-4, after passing the turbine rotor assembly 56, the steam passes through a turbine steam discharge passage 81 (FIGURE 1) and into the steam condenser 16. More particularly, the turbocompressor 13 is suitably mounted on an end plate 82 (FIGURE 2) of the steam condenser, as by bolts, with the turbine discharge passage in communication with a steam inlet port 84 in the end plate. A condensate chamber 86 of the steam condenser 16 is in communication with the interior of a cylindrical shell 87 of the steam condenser through a port 88 in the end wall plate 82. The drain 76 opens into the condensate chamber 86. The steam condensate pump 17 withdraws the steam condensate from the condensate chamber through condensate line 103 and pumps the condensate back to the steam generator 12 and the bearings 18. Thus, the turbocompressor chamber 73, the steam discharge passage 81, the drain 76, and the interior of the steam condenser 16, are all at substantially the same pressure, that is, the steam condenser pressure which is below ambient atmospheric pressure during normal operation. To further assure that the turbocompressor chamber 73 is at steam condenser pressure, a suitable equalizer or vent connection may be provided, and, as shown in FIGURE 1, a vent 90 extends between the exhaust steam chamber 80 and the chamber 73.

Within the steam condenser shell 87, both the first condensing portion 34 and the second condensing portion 41 are in the form of U-tubes suitably mounted in and opening through a header plate 101 opposite the end plate 82. A header chamber shell 102 is suitably secured to the header plate 101, as by bolts 102', and has partitions, as 102", for circulating condensing water through the U-tubes of the first condensing portion 34 and then discharging the condensing water through the condensing water outlet line 29 to the cooling tower. Inlet and outlet branches of the heating water line open into the header 102 and suitable communication is provided by means of the shell partition 102" with the U-tubes of the second condensing portion 41 to provide water for condensing steam and for returning the heated water to the area having a heating requirement.

The refrigerant injected into the steam condenser to blanket the first condensing portion 34 enters the steam condenser through a refrigerant port 106 at the end of the refrigerant line 35 within the steam condenser 16 between the first condensing tube bundle 34 and the second condensing tube bundle 41 adjacent an end of the condensing tubes opposite the condensate port 88 and the steam inlet 84, as may best be seen in FIGURE 2.

A baffle 107 extends between upper and lower portions of the steam condenser between the first and second condensing tube bundles 34 and 41, to prevent the flow of fluids therebetween except in a limited area of communication 108 at the refrigerant port 106. The entering steam first flows from the steam condenser inlet 84 across the second condensing bundle 41 and then through the area of limited communication 108 between the upper and lower sections of the steam condenser and past the refrigerant inlet port 106, and then past the first condensing bundle 34. The refrigerant vapor entering the steam condenser 16 is drawn across the tubes of the first condensing bundle 34, and in the illustrated embodiment each tube is effectively individually enveloped by a sheath or layer of refrigerant vapor thereby insulating the tubes of the first condensing bundle from the steam to reduce the steam condensing capacity.

With reference to FIGURES 2 and 4, the purge line 40 opens into a side of the steam condensate chamber 86 at a level to withdraw steam condensate from the chamber should the condensate level rise too high. Responsive to a low condensate level in the condensate chamber 86, a float actuated sensor 112 opens a normally closed shut-off valve 113 in the make-up water line 40' from the water supply pump 38, to maintain a minimum level of condensate in the chamber 86.

In the illustrated embodiment, a cylindrical refrigerant condenser shell 116 extends between the condenser end plate 82 and the header plate 101 and envelops the steam condenser shell 87, to effectively prevent the entry of ambient air into the steam condenser and to insulate the steam condenser, as for heating the load. Suitable U-tubes, as 117, are provided in the refrigerant condenser and have adjacent ends suitably mounted in and opening through the header plate 101 in communication with partitioned areas of the header chamber shell 102 so that condensing water from the refrigerant subcooler 22 is first circulated through the refrigerant condenser U-tubes 117 and then passed through the tubes of the steam condenser first condensing bundle 34 before being discharged from the condensing unit through the condensing water outlet 29.

Responsive to the compressor 20 being driven by the turbine 14, refrigerant vapor is drawn from the cooler 24 through a suction line 121 and into the compressor inlet, compressed, and discharged through a compressor outlet and a discharge line 122 into the refrigerant condenser 21 where it is condensed and cooled. The refrigerant condensate then flows through a refrigerant condensate line 123 into the refrigerant subcooler 22 from which it passes through the refrigerant flow restricting means 23, here in the form of a float valve unit, and flows through a cooler refrigerant supply line 124 and into a cooler refrigerant inlet 125 extending through shell 126 of the cooler 24. A suitable equalizer line 126' connects the float valve unit chamber and the refrigerant condenser, for reasons well understood in the art.

The refrigerant inlet 125 opens into a refrigerant pan 127 spaced above the bottom of the cooler shell 126. A U-tube bundle 128 of the chilled water line 25 is within the refrigerant pan 127 so that during normal operation of the system, the tubes are flooded by boiling refrigerant. The refrigerant evaporates from the pan and passes into a refrigerant chamber 129 in an upper portion of the cooler shell 126 above the pan. A refrigerant outlet 130 opens into the refrigerant chamber 129 and is connected with the compressor inlet 120 by the suction line 121.

The portion of the cooler 24 below the refrigerant pan 127 provides a water sump 132. The jet pump 39 is positioned within the sump 132 so that the impeller water and refrigerant vapor and water vapor purged from the steam condenser 16 through the purge line 40 are injected directly into the sump. The inlet of the water supply pump 38 is connected into the sump 132 by means of a pump supply line 133 so that the sump water is recirculated through the sump. The water and refrigerant from the jet pump is directed against the bottom of the pan 127 to cool these fluids, and during normal operation of the system, heated fluid from the steam condenser maintains the sump preferably at least 10° F. above the temperature of the refrigerant chamber, so that refrigerant in the sump is boiled out as a vapor. The temperature of the jet pump impeller water must be below the water saturation temperature corresponding to the total pressure of refrigerant and water vapor in the steam condenser. For example, at a steam condenser pressure of 27" Hg, the water saturation temperature is 115° F. and the jet impeller water temperature must be below 115° F. to prevent flashing in the jet pump rendering the purge system inoperative. Thus, upon loss of refrigerant or an electrical failure, the steam condenser will not be purged and refrigerant may back up in the purge line 40' to stop the turbocompressor.

Refrigerant vapor in the sump 132 passes upwardly about the left end of the refrigerant pan 127 into the refrigerant chamber 129 from which it is withdrawn through the suction line 121. Water in the refrigerant chamber 129 collects on top of the liquid refrigerant in the pan 127 and passes to the left end of the pan from which it flows through a suitable weir or port 134 in the end of the pan and into the sump 132. The chilled water tube bundle is spaced inwardly from the left end wall of the pan to form a relatively quiet area of liquid refrigerant upon which any water in the pan collects in a relatively quiet pool. Thus, means are provided for separating refrigerant fluid and power fluid, and for returning these fluids for reuse in the system.

The control arrangement has been, in part, previously described and in summary: If the leaving chilled water temperature drops, indicating a reduced cooling requirement, the modulating refrigerant valve 36 in the refrigerant line 35 to the steam condenser 16 is opened slightly more to permit more refrigerant to enter the steam condenser for increasing the blanketing of the first condensing bundle 34 to increase the turbine back pressure, thus reducing the turbocompressor power output and causing the compressor 20 to deliver a smaller quantity of refrigerant to the cooler 24, thereby reducing the cooling capacity of the system and providing a desired temperature of the leaving chilled water. Should the leaving chilled water temperature rise, indicating a rise in the cooling requirement, the refrigerant valve 36 is closed sufficiently and less refrigerant is injected into the steam condenser so that the quantity of refrigerant vapor effectively blanketing the first condensing bundle 34 is reduced as the constant rate purge 40 withdraws refrigerant from the steam condenser. If desired, suitable guide vanes may be provided on the compressor to improve efficiency somewhat.

To shut down the system, a shutdown blast valve 150 in a refrigerant line 151 between an upper portion of a refrigerant condenser 21 and the steam inlet 84 of the steam condenser 16, is closed during normal cooling operation of the system and is opened for fully blanketing all condensing portions of the steam condenser with refrigerant vapor, thereby increasing the back pressure on the turbine 14 to that of the steam supply pressure at the turbine inlet, thus substantially instantaneously stopping operation of the turbine and thereby the compressor 20.

With reference to FIGURES 1, 5 and 6, the system may be manually shut down, and may also be automatically shut down in the event of malfunction of the system. For example, should there be a failure in the supply of lubricating water to the bearings 18 in the turbocompressor 13, a flow sensing device 155 in the lubricating water line 68 opens the blast valve 150 to shut down the system. Similarly, should the turbocompressor 13 enter an overspeed condition, an overspeed sensor 156 on the turbine 14 causes the blast valve 150 to open. In the illustrated embodiment, an excessively low temperature in the cooler 24 will actuate a low temperature cutout 157 (LTCO in FIGURE 5) to similarly open the blast valve 150 and shut down the system. Furthermore, the blast valve 150 is retained in a closed position when the electrical system (FIGURES 5 and 7) is energized, and is in an open position when the electrical system is deenergized, so that in the event of an electrical failure, the blast valve 150 automatically opens to shut down the refrigeration system. Other emergency shut down devices for opening the blast valve 150 may be provided as is deemed desirable.

The electrical portion of the control system is illustrated diagrammatically in FIGURE 5 in an OFF position. The electrical control circuit includes a gang switch assembly of a type in which a selector knob is rotated to rotate a shaft mounting a cam for selectively operating switch actuators. Assemblies of this type are available in the field, and, Minneapolis Honeywell Company markets such an assembly as 910B Type "Micro Switch." The switch assembly is operable in opposite directions between a HEAT position for winter heating, the OFF position, a simultaneous COOL & HEAT-RUN position for providing both heating and cooling, and a COOL & HEAT-START position for starting the system in operation. The gang switch assembly has a total of seven switch sets designated GS1 through GS7 in FIGURES 5 and 6. Gang switches 1 and 2 as well as gang switches 3 and 4 each have a common movable switch member so that in each of these two units of switches, one of the switches is closed when its companion switch is opened.

Gang switches 5, 6 and 7 each have independently movable switch members.

In the OFF position, the gang switch GS1 is closed so that an OFF indicator light 160 is illuminated and the remainder of the circuit is not energized. In all other positions of the gang switch the light 160 is off.

The control circuit is preferably operated by a 115 v. 60-cycle power supply, but various pump motors are preferably operated by a 440 v. 3-phase power supply so that suitable motor starters S (FIGURE 7) are provided in the control circuit (FIGURE 5). The starter in FIGURE 7 is shown with its 115 v. circuit deenergized. As is common practice, such starters are often provided with auxiliary contacts, and certain of these auxiliary contacts (reference symbol "AUX.") are in the 115 v. control circuit shown in FIGURE 5. For example, the motor starter for the tower water pump 27, designated S(27) and illustrated separately in FIGURE 7, has an auxiliary contact S(27)AUX. shown in both FIGURES 5 and 7. These starters provide thermal protection for the motors by means of bimetallic switches, as 161 and 162 (FIGURE 7) heated by heating elements 163 and 164, respectively, in different lines of the 3-phase 440 v. circuit. In the event a line overheats during operation of a motor, the associated bimetallic switch will open breaking the 115 v. circuit to a solenoid 165 of the starter and permitting motor contacts, as 166, and the auxiliary contact, as S(27)AUX., to open, breaking the 440 v. circuit to the motor and a 115 v. holding circuit including the auxiliary S(27)AUX., to shut down the system.

In the HEAT position, the gang switch GS4 is closed so that a HEAT signal light 170 is illuminated. Both the chilled water pump 26 and the tower water pump 27 are inoperative since the gang switch GS3 is open, and the starters S(26) and S(27) are therefore not energized in the 115 v. circuit (FIGURE 5), so that a holding circuit is open. However, in the HEAT position the steam condensate pump 17, the hot water pump 41' and the water supply pump 38 are in operation since gang switch GS2, GS5 and GS6 are closed. By closing gang switch GS6 and opening gang switch GS7 during winter heating, a time delay relay TDR and associated relay 1R are deenergized and their switch is TDR1 and 1R1 remain open.

In changing from HEAT operation to COOL & HEAT operation, the gang switch must be moved through the OFF position thus deenergizing the control circuit. In moving from the HEAT to the OFF position, gang switch GS2 opens before gang switch GS7 closes, to avoid closing the holding circuit momentarily and energizing the pump motors and their starters. In starting COOL & HEAT operation the gang switch is first momentarily placed in the COOL & HEAT-START position in order to momentarily close gang switch GS5 to energize the time delay relay TDR and thereby the relay 1R so that switch 1R1 is closed, until lubricating water for the turbine bearings 18 is flowing adequately through the lubricating water line 68 to actuate the lubricant water flow sensor 155 and thus close a companion switch in the holding circuit (FIGURE 5), and to permit adequate time for the remainder of the holding circuit switches to close. The gang switch should be maintained in the START position just long enough to assure that the holding contact 1R1 will be maintained closed, and the gang switch actuator is therefore so arranged that the gang switch assembly is spring biased from the COOL & HEAT-START position to the COOL & HEAT-RUN position. Should the gang switch assembly be maintained in the START position, the system will operate properly but the safety shut-down features will be eliminated because gang switch GS5 is held closed. A relay 2R is energized to hold its holding circuit contact 2R1 closed when the holding circuit is closed and this contact opens when any holding contact opens, to immediately open the blast valve 150 and shut down the system even though the holding contact may chatter. When in COOL & HEAT operation, a COOL & HEAT light 173' is illuminated.

The time delay relay TDR closes instantaneously and provides a suitable time delay in the opening of its contact TDR1, for example a two minute delay, so that upon shutdown of the system, the various pumps as well as the make-up water supply system remain in operation.

The steam generator controls may be of any suitable nature and only a portion thereof are illustrated in FIGURE 5, the remainder being indicated schematically by a control box 174 (FIGURES 1 and 5). The controls illustrated in FIGURE 5 include an ON-OFF switch 175 for the steam generator. A low boiler water level sensor 176 operates at reduced voltage responsive to normal operation of either the HEAT or the COOL & HEAT circuits, and is illustrated in the form of an electrical probe which closes a circuit when immersed in water. In the event that the boiler water level drops too low, a normally closed contact 177 in the holding circuit opens to break the holding circuit and stop operation of the system.

Whenever the refrigeration system is shut down, it is pressurized with refrigerant vapor injected through the blast valve line 151 into the steam condenser 21, from which it passes into the turbine 16, the steam generator 12, and pressurizes the entire power side of the system. At shutdown, refrigerant pressure is about 50 p.s.i.g. Thus, means are provided for effectively preventing leakage of ambient air into the system and particularly into the power side of the system.

Whenever the refrigeration system is placed in operation after shutdown, it must be purged of the pressurizing refrigerant. As soon as the water supply pump 38 starts operation, the purge 40 commences to remove refrigerant vapor from the steam condenser 16. Refrigerant in the power side of the system eventually passes into the steam condenser and is removed by the purge 40. Initially, as steam passes to the turbine 14, the back pressure in the pressurized steam condenser 16 effectively prevents start-up of the turbine. As purging of the steam condenser continues, the steam condenser pressure drops so that the turbine rotor assembly 56 gradually and smoothly begins to rotate. From start-up to normal operation of the turbine takes about three minutes.

Steam condenser pressure is a dominant factor in controlling the system and herein is utilized to provide more precise control of the hot gas bypass 42 for retarding surge of the turbocompressor 13. More particularly, the pressure sensor 44 in the steam condenser 16 operates the modulating refrigerant valve 43 in the hot gas bypass line 42 for passing refrigerant vapor from the refrigerant condenser 21 to the refrigerant line 124 between the float valve 23 and the cooler 24.

Normal operating conditions in various parts of the system are indicated in the following table:

| Cooling Capacity, Percent | 100 | | 50 | | 0 | |
|---|---|---|---|---|---|---|
| Entering Condensing Water, °F | 85 | 65 | 85 | 65 | 85 | 65 |
| Lv. Chilled Water, °F | 44 | 43 | 42 | 41.5 | 40.5 | 40 |
| Cooler: | | | | | | |
| °F | 36 | 35 | 34 | 33 | 32.5 | 32 |
| p.s.i.a | 19.7 | 19.2 | 18.7 | 18.2 | 18 | 17.7 |
| Steam Condenser: | | | | | | |
| °F | 115 | 155 | 130 | 175 | 135 | 180 |
| p.s.i.a | 1.5 | 4.2 | 2.2 | 6.7 | 2.5 | 7.5 |
| Ref. Condenser: | | | | | | |
| °F | 105 | 85 | 95 | 75 | 86 | 66 |
| p.s.i.a | 70 | 51 | 60 | 43 | 52 | 36 |
| Ref. Leaving Subcooler, °F | 95 | 75 | 90 | 70 | 86 | 66 |

The invention provides a low first cost installaton over a wide range of capacities. Corrosion problems are eliminated even in the event of condensing or chilled water leakage into the system through poor tube rolls and such, nor are inhibitors, hydrogen suppressors or storage tanks required. While the machine incorporates numerous advantages of an absorption system, it eliminates its many disadvantages such as solution solidification problems encountered in lithium bromide absorption machines, the need of a conventional purge system since the machine is substantially insensitive to the presence of noncondensibles and in this respect it is similar to centrifugal machines, and small leaks will not render the machine completely inoperative as with absorption machines.

Because the steam condenser condensing rate is regulated by blanketing with refrigerant vapor from the refrigerant side and the vapor is returned to the refrigerant side, an effectively inexhaustable supply of such vapor is provided, and control of entering condensing water temperatures and flow rate is unnecessary so that lower average condensing water temperatures may be utilized for greatly reducing operating costs and effectively preventing scaling. Furthermore, the system completely eliminates condensing or absorbent condensing water bypass lines and valves as are used on most absorption machines and also eliminates the need for sensitive condensing water flow adjustment.

The machine is completely and truly hermetic, and servicing is greatly facilitated, for example, leak testing is extremely simple since the entire machine is automatically pressurized with refrigerant on shutdown. It should also be noted that routine service requirements are virtually non-existent, for example, the machine does not require periodic additions of capacity restorer, nor are alkalinity checks required as with most absorption machines.

Since the machine is completely pressurized on shutdown with an inert gas, herein refrigerant vapor, the machine life is greatly extended. Instant pressurization of the steam boiler on shutdown eliminates almost all shutdown corrosion problems encountered with conventional boilers. In the present system, the boiler need never be descaled since no make-up water need be added to the machine. By simple changeover in the turbocompressor, a high steam pressure machine can easily be converted into a low pressure machine, in case operator license requirement becomes important. At low cooling capacity the steam pressure or energy difference across the turbine is very low, thereby effectively preventing turbine overspeed. High partial load efficiency may be obtained by directly modulating boiler input.

While a preferred embodiment of the invention has been described and illustrated, it will be understood that the invention is not limited thereto since it may be otherwise embodied within the scope of the following claims.

I claim:

1. A condensing system comprising a housing adapted to contain a condensible vapor, a plurality of tubing in said housing through which a condensing medium is passed in heat exchange relation with vapor exteriorly thereof for condensing said condensible vapor, means for passing into said housing a fluid which is normally a noncondensible vapor within said housing and blanketing the exterior of said tubes with said noncondensible vapor thereby limiting the condensing capacity of said tubes, and means for selectively regulating throughout a range the quantity of said noncondensible vapor blanketing said tubes, thereby regulating the condensing rate of said condensible vapor.

2. A system according to claim 1 in which means are provided for withdrawing said noncondensible vapor from said housing at a substantially constant rate, and means are provided for regulating the rate at which said noncondensible vapor is passed into said housing, to regulate the condensing rate of said condensible vapor.

3. A method of regulating the condensing capacity of a steam condenser in which the steps consist in passing steam into the condenser, passing into the steam condenser a fluid which is normally a noncondensible vapor therein to blanket a condensing portion of the condenser and suppress the steam condensing capacity of the condenser, varying the steam condensing capacity of the condenser by selectively regulating throughout a range the quantity of vapor in said steam condenser effective to so blanket said condensing portion, withdrawing from the steam condenser the noncondensible vapor and any steam carried therewith, separating the withdrawn noncondensible vapor from the steam carried therewith, and returning at least one of the separated components for reuse in said steam condenser, the noncondensible vapor being withdrawn from the steam condenser at a substantially constant rate, the rate of passing said noncondensible vapor into the steam condenser being regulated to regulate the steam condensing capacity of the steam condenser.

References Cited by the Examiner

UNITED STATES PATENTS 2,924,635    2/1960    Narbut _____ 165—105

ROBERT A. O'LEARY, *Primary Examiner.*

CHARLES SUKALO, *Examiner.*